United States Patent

Yang

(10) Patent No.: US 10,436,316 B2
(45) Date of Patent: Oct. 8, 2019

(54) METHOD FOR PREVENTING INTERLOCK OF TRANSMISSION

(71) Applicants: HYUNDAI MOTOR COMPANY, Seoul (KR); KIA MOTORS CORPORATION, Seoul (KR)

(72) Inventor: Sang Min Yang, Suwon-si (KR)

(73) Assignees: Hyundai Motor Company, Seoul (KR); KIA Motors Corporation, Seoul (KR)

( * ) Notice: Subject to any disclaimer, the term of this patent is extended or adjusted under 35 U.S.C. 154(b) by 0 days.

(21) Appl. No.: 15/808,506

(22) Filed: Nov. 9, 2017

(65) Prior Publication Data

US 2018/0363771 A1 Dec. 20, 2018

(30) Foreign Application Priority Data

Jun. 15, 2017 (KR) .................. 10-2017-0075963

(51) Int. Cl.
| | | |
|---|---|---|
| *F16H 61/12* | (2010.01) | |
| *F16H 59/70* | (2006.01) | |
| *F16H 59/38* | (2006.01) | |
| *F16H 59/40* | (2006.01) | |

(52) U.S. Cl.
CPC ............. *F16H 61/12* (2013.01); *F16H 59/40* (2013.01); *F16H 59/70* (2013.01); *F16H 2059/385* (2013.01); *F16H 2061/1212* (2013.01); *F16H 2061/1264* (2013.01)

(58) Field of Classification Search
CPC .......... F16H 59/40; F16H 59/70; F16H 61/12; F16H 2061/1212; F16H 2061/1264
See application file for complete search history.

(56) References Cited

U.S. PATENT DOCUMENTS

| | | | | |
|---|---|---|---|---|
| 5,704,871 A | * | 1/1998 | Furukawa | ............... F16H 61/02 477/110 |
| 2010/0076652 A1 | * | 3/2010 | Hyodo | ..................... F16H 61/16 701/50 |
| 2012/0253618 A1 | * | 10/2012 | Takada | ..................... F16H 59/70 701/55 |
| 2013/0317712 A1 | * | 11/2013 | Ishikawa | ................. F16H 61/12 701/58 |

FOREIGN PATENT DOCUMENTS

| | | |
|---|---|---|
| JP | 1994-109129 | 4/1994 |
| JP | 2006-336725 | 12/2006 |
| KR | 10-0220073 | 9/1999 |
| KR | 10-0285451 | 1/2001 |
| KR | 10-1210206 | 12/2012 |

* cited by examiner

Primary Examiner — Edwin A Young
(74) Attorney, Agent, or Firm — Brinks Gilson & Lione

(57) ABSTRACT

The present disclosure provides a method for preventing interlock of a transmission. The method may include: sensing, with a controller, target currents of a plurality of solenoid valves, where each solenoid valve of the plurality of solenoid valves is connected to corresponding friction element; and when it is determined that target currents of at least two solenoid valves of the plurality of solenoid valves are equal to or greater than a predetermined current, interrupting, with the controller, a supply of power to the plurality of solenoid valves based on a degree of deviation of an actual speed of a transmission output shaft from a target speed for a predetermined time.

6 Claims, 2 Drawing Sheets

METHOD FOR PREVENTING INTERLOCK OF TRANSMISSION

CROSS REFERENCE TO RELATED APPLICATION

The present application claims priority to and the benefit of Korean Patent Application No. 10-2017-0075963 filed on Jun. 15, 2017, which is incorporated herein by reference in its entirety.

FIELD

The present disclosure relates to a method for preventing interlock of a transmission, which determines whether a vehicle transmission is interlock, thereby preventing the occurrence of interlock without the application of a fail-safe valve.

BACKGROUND

The statements in this section merely provide background information related to the present disclosure and may not constitute prior art.

An automatic transmission within a vehicle is a device for automatically changing power that is supplied from a power generation device, such as an engine or the like, to torque and rpms for a smooth driving.

As transmission ratios that can be internally implemented in the automatic transmission become various, power supplied from the power generation device may be more suitably changed depending on the driving state of the vehicle, and the fuel efficiency and power performance of the vehicle may be improved.

In order to implement various transmission ratios, controlling multiple friction elements as well as making good shift quality without shift shocks by precisely controlling the respective friction elements is desired. Also, the friction elements may be operated depending on a fixed combination, and a fail-safe function may be desired to avoid the possibility of malfunction and perform the minimum operation even in the event of failure.

In a conventional art, each of solenoid valves for providing hydraulic pressure to the friction elements is connected to a fail-safe valve, where the occurrence of an interlock situation may be inhibited. However, when a number of friction elements are used for the implementation of a multi-range transmission, the cost of applying fail-safe valves may increase.

SUMMARY

The present disclosure provides a method for preventing interlock of a transmission, in which the occurrence of interlock of a transmission may be inhibited even if a fail-safe valve is not applied.

In one aspect of the present disclosure, a method for preventing interlock of a transmission is provided, including: sensing, with a controller, target currents of a plurality of solenoid valves, where each solenoid valve of the plurality of solenoid valves is connected to corresponding friction element; and when it is determined that target currents of at least two solenoid valves of the plurality of solenoid valves are equal to or greater than a predetermined current, interrupting, with the controller, a supply of power to the plurality of solenoid valves based on a degree of deviation of an actual speed of a transmission output shaft from a target speed for a predetermined time.

Interrupting the supply of power to the plurality of solenoid valves may include: counting, with the controller, a number of times during a predetermined time that a cumulative sum of a difference between the actual speed of the transmission output shaft and the target speed reaches a predetermined value; and when the number counted with the controller is equal to or greater than a predetermined number, interrupting, with the controller, the supply of power to the plurality of solenoid valves.

Interrupting the supply of power to the plurality of solenoid valves may further include: calculating, with the controller, a gear ratio based on a turbine speed and a speed of the transmission output shaft and determining whether the gear ratio is included in a gear ratio region; when it is determined that the gear ratio is not included in the gear ratio region, checking, with the controller, whether the solenoid valves maintain a constant current for a predetermined time, wherein the target currents of the solenoid valves are equal to or greater than the predetermined current; and when it is determined that the solenoid valves do not maintain the constant current for the predetermined time, counting, with the controller, the number of times during first predetermined time that the cumulative sum of the difference between the actual speed of the transmission output shaft and the target speed reaches first predetermined value.

The method for preventing interlock of the transmission may include: when it is determined that the solenoid valves maintain the constant current for the predetermined time, counting, with the controller, the number of times during second predetermined time that the cumulative sum of the difference between the actual speed of the transmission output shaft and the target speed reaches second predetermined value.

The method for preventing interlock of the transmission may include: when it is determined that the gear ratio is included in the gear ratio region, counting, with the controller, the number of times during the second predetermined time that the cumulative sum of the difference between the actual speed of the transmission output shaft and the target speed reaches the second predetermined value.

The method for preventing interlock of the transmission may include: sensing the target currents of the plurality of solenoid valves is performed only when a shift lever is in a D range and a vehicle failure signal is not received.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
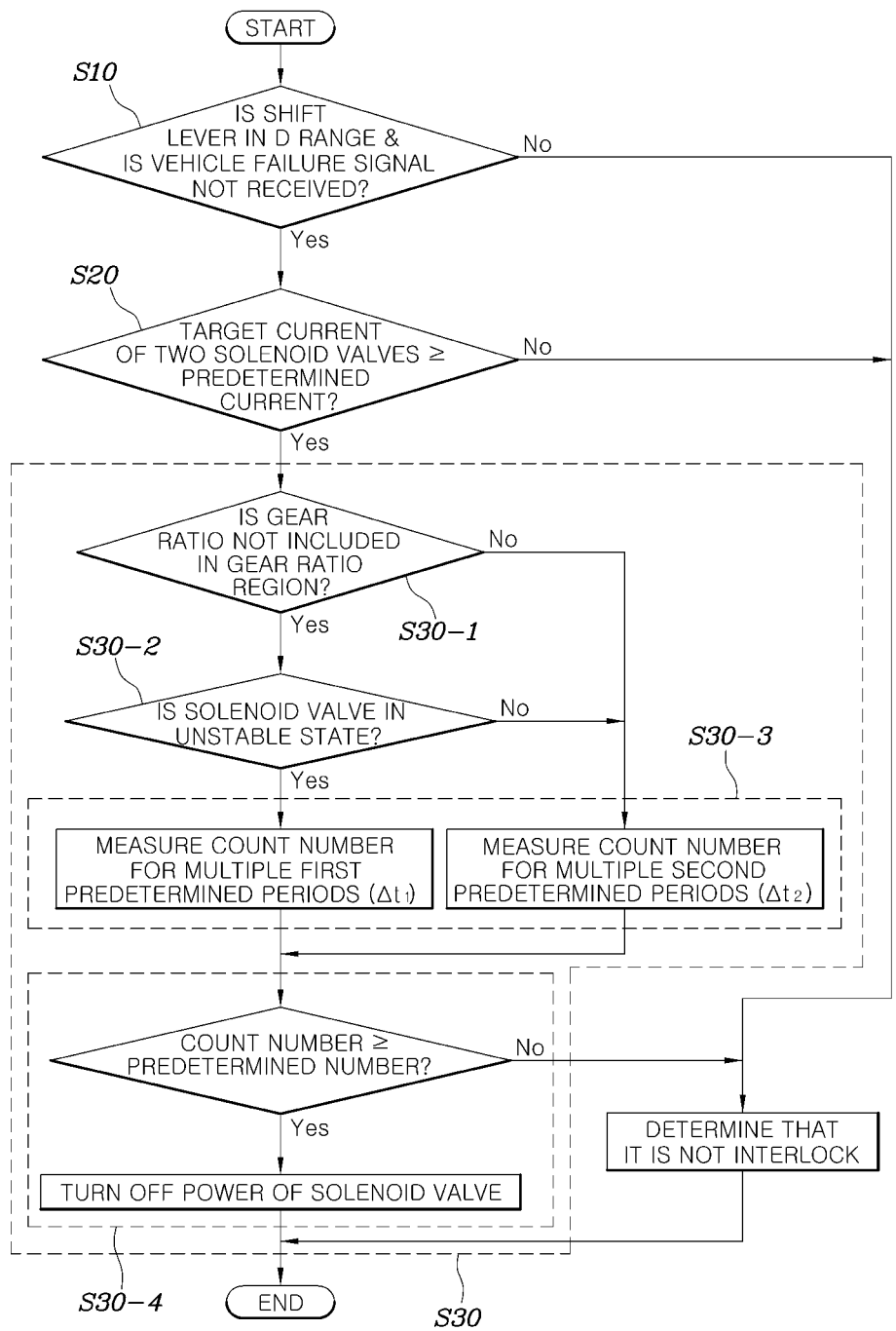
FIG. 1 is a flowchart illustrating a method for preventing interlock of a transmission.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinbelow, a method for preventing interlock of a transmission in some forms of the present disclosure will be described in detail with reference to the accompanying drawings.

Figure 2:
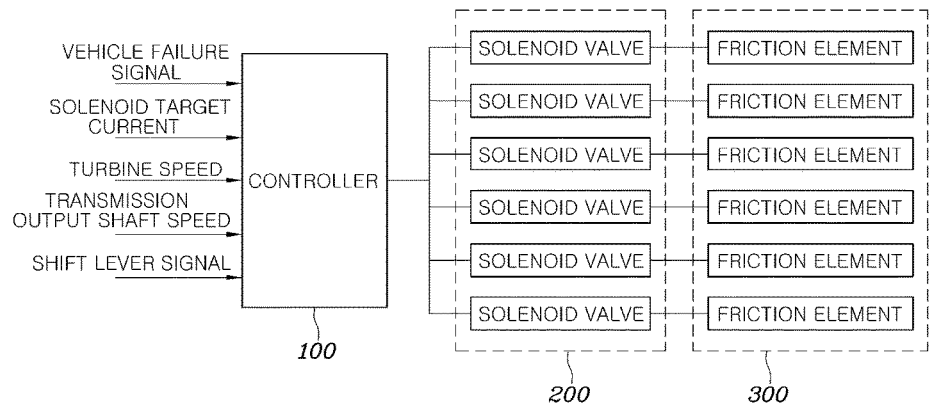
FIG. 2 is a block diagram illustrating an apparatus for preventing interlock of a transmission.

FIG. 1 is a flowchart illustrating a method for preventing interlock of a transmission in some forms of the present disclosure, and FIG. 2 is a block diagram illustrating an apparatus for preventing interlock of a transmission in some forms of the present disclosure.

Referring to FIG. 1 and FIG. 2, a method for preventing interlock of a transmission may include a current-sensing step S20 in which a controller 100 senses the target currents of multiple solenoid valves 200, each of which is connected to a corresponding one of multiple friction elements 300; and an interlock prevention step S30 in which the controller 100 interrupts the supply of power to the multiple solenoid valves based on the degree of deviation of the actual speed Nor of a transmission output shaft from the target speed Not thereof for a predetermined time period when it is determined as the result of performing the current-sensing step S20 that the target currents of at least two of the multiple solenoid valves 200 are equal to or greater than a predetermined current.

The multiple friction elements 300 are arranged in the transmission, and depending on the operation thereof, a clutch-brake unit for gear-shifting is configured. Each of the multiple friction elements 300 is connected to a corresponding one of the solenoid valves 200, and the operation thereof is controlled through pressure supplied from the solenoid valve 200.

Here, the multiple solenoid valves 200 are hydraulically controlled by a Transmission Control Unit (TCU), but if the solenoid valves are erroneously controlled due to malfunction of the TCU, two solenoid valves 200 may simultaneously operate. Here, an interlock situation in which the hydraulic pressure on the two friction elements causes locking may occur.

Such interlock, occurring due to the transmission control error of an automatic transmission, must be prevented because it may cause damage on the transmission or a secondary accident because a wheel is locked.

In this regard, the controller 100 in some forms of the present disclosure detects conditions in which interlock may be caused because the multiple solenoid valves 200 are wrongly controlled by a TCU, and performs control in order to prevent such interlock.

Specifically, the controller 100 senses the target currents of the multiple solenoid valves 200. Based on the sensed target currents, whether the target currents of two or more of the multiple solenoid valves 200 are equal to or greater than the predetermined current is determined at step S20. That is, the controller 100 receives target current data for controlling the solenoid valves 200 from the TCU and checks whether the target current is equal to or greater than the predetermined current, which is a critical current value that may cause the occurrence of interlock, whereby the possibility of the occurrence of interlock of the transmission may be determined.

If the target currents of at least two solenoid valves 200 are equal to or greater than the predetermined current, the multiple solenoid valves 200 may operate, and which may cause the multiple friction elements 300 to operate at the same time. In this case, the controller 100 performs logic for preventing interlock.

However, the target currents of two or more of the solenoid valves 200 that are equal to or greater than the predetermined current do not necessarily cause interlock. That is because the solenoid valves 200 may simultaneously operate also in the common gear-shifting process.

Therefore, the controller 100 in some forms of the present disclosure determines whether conditions satisfy an interlock situation additionally based on the degree of deviation of the actual speed of a transmission output shaft from the target speed thereof for a predetermined time period $\Delta t$, and interrupts the supply of power to the multiple solenoid valves 200 depending on the determination, whereby the interlock of the vehicle is prevented at step S30.

That is, because interlock occurring in a vehicle causes vibration in a transmission output shaft, the actual rotational speed of the transmission output shaft deviates from the target speed thereof. Therefore, the controller 100 may determine whether interlock occurs in a vehicle based on the degree of deviation of the actual speed of the transmission output shaft from the target speed thereof.

Specifically, the interlock prevention step S30 includes a counting procedure S30-3 in which the controller 100 counts the number of times that a cumulative sum of the difference between the actual speed of the transmission output shaft and the target speed thereof for the predetermined time period reaches a predetermined value during repetitions of the predetermined time period $\Delta t$; and a procedure S30-4 in which the controller 100 interrupts the supply of power to the multiple solenoid vales 200 when the counted number is equal to or greater than a predetermined number after the counting procedure S30-3.

Figure 3:
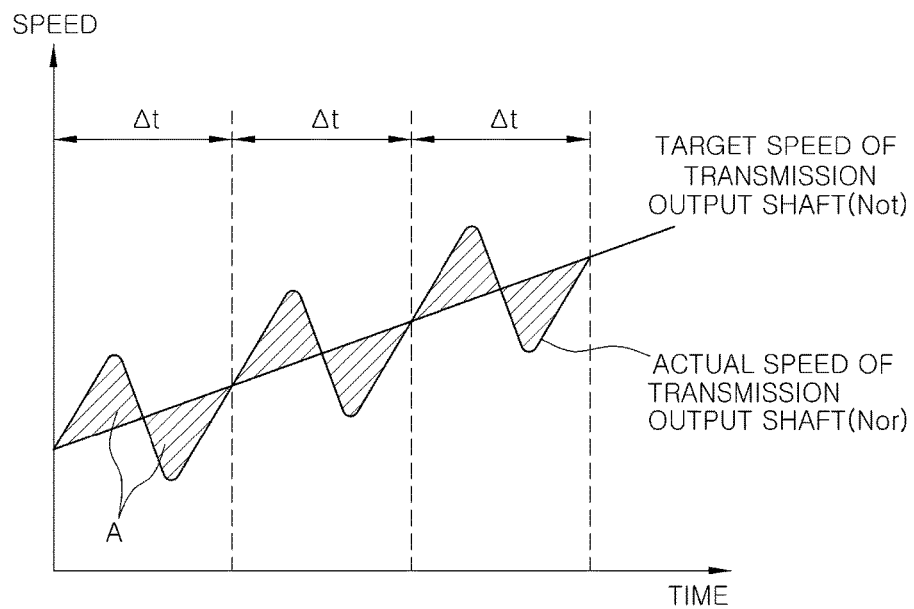
FIG. 3 is a graph illustrating the variation of the actual speed and the target speed of a transmission output shaft in an interlock situation.

FIG. 3 is a graph illustrating variation of the actual speed and the target speed of a transmission output shaft in an interlock situation in some forms of the present disclosure.

Referring to FIG. 3, a predetermined time period $\Delta t$ is consecutively repeated multiple times, and the controller calculates a cumulative sum of the difference between the actual speed of a transmission output shaft and the target speed thereof for the predetermined time period $\Delta t$. Here, the cumulative sum is represented as the hatched line area A between the actual speed of the transmission output shaft and the target speed thereof for the predetermined time period $\Delta t$, as illustrated in FIG. 3.

If the cumulative sum is greater than the predetermined value, the controller 100 determines that the count number increases in the corresponding predetermined time period $\Delta t$, and compares the count number, accumulated during consecutive repetitions of the predetermined time period $\Delta t$, with the predetermined number, thereby determining whether excessive vibration occurs in the transmission output shaft due to interlock.

When interlock is detected as described above, the controller 100 interrupts the supply of power to the multiple solenoid valves 200, whereby the interlock state, which may be maintained due to the supply of hydraulic pressure to the friction elements 300, may be avoided.

Also, the interlock prevention step S30 in some forms of the present disclosure further includes a determination procedure S30-1 in which the controller 100 calculates a gear ratio Nt/No based on the turbine speed Nt and the transmission output shaft speed No and determines whether the calculated gear ratio is included in a gear ratio region; and a checking procedure S30-2 in which the controller 100 checks whether the solenoid valves 200, the target currents of which are equal to or greater than the predetermined current, maintain a constant current for a certain time period when it is determined as the result of performing the determination procedure S30-1 that the gear ratio is not included in the gear ratio region. Here, when it is determined as the result of the checking procedure S30-2 that the drive currents of the solenoid valves 200, the target currents of which are equal to or greater than the predetermined current, are not maintained for the certain time period, the controller 100 may perform the counting procedure S30-3 after setting the predetermined time period and the predetermined value to a first predetermined time period and a first predetermined value, respectively.

That is, the controller 100 in some forms of the present disclosure additionally performs logic for determining whether gear-shifting is being performed or whether gear-shifting has been completed and a transmission gear is in an in-gear state.

This is because variation of the speed of the transmission output shaft during gear-shifting differs from that in the in-gear state. That is, the controller 100 determines whether the interlock occurs using the speed No of the transmission output shaft, but the predetermined time period and the predetermined value required for accurately determining whether interlock occurs may vary depending on a situation. Accordingly, it is desirable to correctly detect whether gear-shifting is being performed and to then set the predetermined time period and the predetermined value depending on the result of detection.

The gear ratio region represents a certain range of gear ratios that configure respective gear levels. Therefore, whether the gear ratio Nt/No, which is the actual measurement value calculated by dividing the turbine speed Nt by the speed No of the transmission output shaft, is included in the gear ratio region is checked, whereby whether gear-shifting is being performed or has been completed may be determined at step S30-1.

Also, when the drive current consumed for driving the solenoid valve 200 is maintained for the certain time period, the controller 100 determines that solenoid valve 200 maintains a stable state and that gear-shifting has been completed. Conversely, when the drive current of at least one of the solenoid valves 200 is not maintained for the certain time period, the controller 100 determines as a result of the checking procedure S30-2 that the solenoid valve 200 is in an unstable state and that gear-shifting is being performed.

Accordingly, when it is determined as a result of the determination procedure S30-1 that the gear ratio is not included in the gear ratio region and when it is determined as a result of the checking procedure S30-2 that the drive currents of the solenoid valves 200, the target currents of which are equal to or greater than the predetermined current, are not maintained constant for the certain time period, the controller 100 determines that gear-shifting is being performed and then performs the counting procedure S30-3 using the first predetermined time period and the first predetermined value, which are a predetermined time period and a predetermined value corresponding to the situation. That is, in the counting procedure S30-3, the number of times that a cumulative sum of the difference between the actual speed Nor of the transmission output shaft and the target speed Not thereof for the first predetermined time period Δt1 reaches the first predetermined value is counted during repetitions of the first predetermined time period Δt1.

Conversely, when it is determined as the result of the checking procedure S30-2 that the drive current of at least one of the solenoid valves, the target currents of which are equal to or greater than the predetermined current, is maintained constant for the certain time period, the controller 100 may perform the counting procedure S30-3 after setting the predetermined time period and the predetermined value to a second predetermined time period Δt2 and a second predetermined value, respectively.

Also, when it is determined at the determination procedure S30-1 that the gear ratio Nt/No is included in the gear ratio region, the controller 100 may perform the counting procedure S30-3 after setting the predetermined time period and the predetermined value to the second predetermined time period Δt2 and the second predetermined value, respectively.

In other words, when it is determined as a result of the determination procedure S30-1 that the gear ratio Nt/No is included in the gear ratio region and when it is determined as a result of the checking procedure S30-2 that the drive current of at least one of the solenoid valves 200 is maintained constant for a certain time period, the controller 100 determines that the transmission gear is in the in-gear state because gear shifting has been completed, and performs the counting procedure S30-3 after setting the predetermined time period and the predetermined value to the second predetermined time period Δt2 and the second predetermined value, respectively, in order to clearly detect an interlock situation in the corresponding state.

Here, because the controller 100 determines a gear-shifting state based not only on the gear ratio Nt/No but also on whether the solenoid valve 200 is in a stable state, it is possible to prevent an abrupt change of the transmission output shaft speed or the turbine speed from causing the erroneous determination about the completion of gear-shifting.

Meanwhile, the controller 100 may perform the current-sensing step S20 only when a shift lever is in a D range and a vehicle failure signal is not received.

Some vehicles use an interlock situation in order to prevent themselves from rolling either forward or backward when they are parked. Accordingly, in order to avoid interlock that may occur during the driving, the controller 100 performs the above-mentioned interlock prevention logic only when the shift lever is in a D range.

Also, when it receives other failure information or information about interlock of a vehicle from another failure diagnosis device included in the vehicle, the controller 100 does not perform interlock prevention logic in order to secure the safety of the vehicle.

With the method for preventing interlock of a transmission described above, a transmission interlock may be detected and prevented even if a fail-safe valve is not applied, thereby reducing the costs and weight for the application of the valve.

Also, because an interlock attributable to the malfunction of a TCU may be inhibited, damage on a transmission or a secondary accident arising from locking of a wheel may be also inhibited, thereby securing the safety of passengers.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method for preventing interlock of a transmission, the method comprising:
    sensing, with a controller, target currents of a plurality of solenoid valves, where each solenoid valve of the plurality of solenoid valves is connected to a corresponding friction element of a plurality of friction elements; and
    when it is determined that target currents of at least two solenoid valves of the plurality of solenoid valves are equal to or greater than a predetermined current, interrupting, with the controller, a supply of power to the plurality of solenoid valves based on a degree of deviation of an actual speed of a transmission output shaft from a target speed for a predetermined time.

2. The method of claim 1, wherein interrupting the supply of power to the plurality of solenoid valves comprises:
    counting, with the controller, a number of times during the predetermined time that a cumulative sum of a difference between the actual speed of the transmission output shaft and the target speed reaches a predetermined value; and
    when the number counted with the controller is equal to or greater than a predetermined number, interrupting, with the controller, the supply of power to the plurality of solenoid valves.

3. The method of claim 2, wherein interrupting the supply of power to the plurality of solenoid valves further comprises:
    calculating, with the controller, a gear ratio based on a turbine speed and a speed of the transmission output shaft and determining whether the gear ratio is included in a gear ratio region;
    when it is determined that the gear ratio is not included in the gear ratio region, checking, with the controller, whether the solenoid valves maintain a constant current for the predetermined time, wherein the target currents of the solenoid valves are equal to or greater than the predetermined current; and
    when it is determined that the solenoid valves do not maintain the constant current for the predetermined time, counting, with the controller, the number of times during a first predetermined time that the cumulative sum of the difference between the actual speed of the transmission output shaft and the target speed reaches a first predetermined value.

4. The method of claim 3, wherein:
    when it is determined that the solenoid valves maintain the constant current for the predetermined time, counting, with the controller, the number of times during a second predetermined time that the cumulative sum of the difference between the actual speed of the transmission output shaft and the target speed reaches a second predetermined value.

5. The method of claim 3, wherein:
    when it is determined that the gear ratio is included in the gear ratio region, counting, with the controller, the number of times during a second predetermined time that the cumulative sum of the difference between the actual speed of the transmission output shaft and the target speed reaches a second predetermined value.

6. The method of claim 1, wherein:
    sensing the target currents of the plurality of solenoid valves is performed only when a shift lever is in a D range and a vehicle failure signal is not received.

* * * * *